3,285,931
PREPARATION OF SUBSTITUTED PYRROLE
DERIVATIVES
Rolf K. Huisgen, Munich, Germany, assignor to Union
Carbide Corporation, a corporation of New York
No Drawing. Filed Dec. 21, 1964, Ser. No. 420,151
8 Claims. (Cl. 260—313.1)

This invention relates to substituted heterocyclic compositions. In one aspect, this invention is directed to a novel process for the preparation of substituted pyrrole derivatives. In a further aspect, this invention is directed to certain novel substituted pyrrole derivatives which are a useful class of compounds having significant and unobvious properties in various fields of application.

Pyrrole itself, is formed in coal tar and can be isolated and recovered through its solid potassium derivative. The heterocyclic compound is the parent substance for a wide variety of natural products, such as indole and its derivatives, the bile pigments, certain protein constituents, the porphyrins, certain alkaloids and the like. One of the chief commercial synthesis of pyrrole, is the reaction of ammonia with furan over strong dehydration catalysts such as aluminum oxide.

Heretofore, the preparation of substituted pyrroles has been accomplished by a wide variety of methods depending upon the particular desired substituent. For example, pyrrole is readily halogenated, undergoes nitration, alkylation, and the like. However, each of these methods is not without its disadvantages, particularly when several different substituents are desired on the same ring. In such cases, multistep processes would be required and the resulting yields would be unattractive for commercial production.

It has now been discovered that substituted azlactones undergo a reaction with acetylenically unsaturated compounds to provide substituted pyrrole derivatives. Accordingly, one or more of the following objects will be achieved by the practice of the instant invention.

It is an object of the present invention to provide a simple and practical procedure for the preparation of substituted pyrrole derivatives. A further object of the invention is to provide a process for the preparation of pyrrole derivatives which is practical, economical, and affords reasonable yields. Another object is to provide a novel process which employs readily available and inexpensive raw materials. A further object is to provide a novel process for the preparation of substituted pyrroles from azlactones and acetylenically unsaturated compounds. Another object is to provide certain novel substituted pyrrole derivatives, these and other objects will readily become apparent to those skilled in the art in the light of the teachings herein set forth.

As previously indicated, one aspect of the present invention relates to a novel process for the preparation of substituted pyrrole derivatives. The process comprises heating a mixture of a substituted azlactone (I) or mesoionic azlactone (II) of the respective formula:

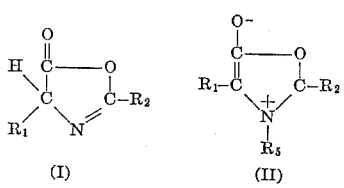

(I)                          (II)

and an acetylenically unsaturated compound of the formula:

$$R_3C \equiv CR_4$$

to a temperature of from about 0° to about 140° C., and thereafter recovering a pyrrole derivative of the formula:

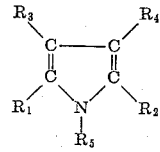

wherein $R_1$–$R_5$ represent hydrogen, or a monovalent aliphatic cycloaliphatic, aromatic or heterocyclic organic group attached to the ring atoms through a carbon to carbon bond, or in the case of $R_5$, through a carbon to nitrogen bond. Preferred compositions which can be prepared by the process of this invention include those of the aforementioned formula wherein $R_1$–$R_5$ contain from 1 to 12 carbon atoms. Also preferred are those compositions wherein the R variables represent a hydrocarbon or a heterocyclic group of from 1 to 12 carbon atoms and which themselves may be substituted. Examples of substituents which may be attached to the hydrocarbon or heterocyclic groups include amino, cyano, hydroxyl, halo, isocyanato, nitro, sulfo, thio, or groups composed of the elements of the class consisting of carbon, hydrogen, and at least one member of the class consisting of oxygen, nitrogen, and sulfur. Particularly, preferred compositions which can be prepared by the process of the instant invention include those wherein the R variable represents alkyl, alkenyl, cycoalkyl, cycloalkenyl, aryl, arylalkyl, alkylaryl, alkoxyaryl, alkoxyalkyl, aryloxyalkyl, alkanoylalkyl, alkoxycarbonyl, aroylalkyl, aroyloxyalkyl, carboxyalkyl, carboalkoxyalkyl, formylalkyl, hydroxyalkyl, hydroxyalkoxylalkyl, haloalkyl, haloformylalkyl, aminoalkyl, diaminoalkyl, arylaminoalkyl, carbamylalkyl, thioalkyl, thioaryl, thiocarbamylalkyl, nitroalkyl, sulfoalkyl, cyanoalkyl, isocyanoalkyl, thiocyanoalkyl, and the like.

Illustrative substituted pyrroles which can be prepared in accordance with the teachings of this invention include, among others, dimethyl 2-phenyl-5-methyl-pyrrole-3,4-dicarboxylate, dimethyl 2,5-diphenylpyrrole - 3,4 - dicarboxylate, dimethyl 2-(o-nitrophenyl)-5-phenyl-pyrrole-3,4-dicarboxylate, dimethyl 2-(p-methoxyphenyl)-5-phenylpyrrole-3,4-dicarboxylate, 2,5-diphenyl-1-methyl - 3 - n-butylpyrrole and the like.

As hereinbefore indicated the conversion of the azlactone and acetylenic compound to the substituted pyrrole is effected by heating a mixture of the reactants, preferably in an inert solvent. Although the temperature employed will largely be dependent upon the particular reactants, in general, a temperature range of from about 0° to about 140° C. has been found to be satisfactory. Temperatures above and below the aforesaid range can also be employed but are less preferred.

The use of an insert solvent for the reaction is preferred though not asbolutely necessary. In some instances, particularly, if the starting reactants are liquid, it may be possible to effect the reaction in the absence of a solvent. However, for most practical purposes the use of a solvent is preferred. In genreal, the choice of the solvent will largely be dependent upon its inability to undergo reactions with either the starting material or substituted pyrrole product; its ease of separation from the reaction product; as well as economic considerations. A variety of inert, anhydrous, organic solvents can optionally be employed in the practice of the instant process, i.e., saturated aliphatic hydrocarbons, aromatic hydrocarbons, saturated aliphatic ethers, saturated cycloaliphatic ethers, and halogen substituted saturated aliphatic hydrocarbons. Typical solvents which can be employed include benzene, toluene, xylene, dioxane, and the like.

The amount of solvent present is not necessarily critical and can vary within wide limits. It is noted that the amount of diluent employed will also vary with the particular compound used and the manner in which the process is conducted. Preferred solvents are those completely miscible with the reactant and product and which can be readily separated. Pressure is not necessarily critical and the process can be conducted at atmospheric, subatmospheric or superatmospheric pressures. Additionally, if desired, the process can be conducted in an inert atmosphere, such as nitrogen, argon, and the like.

The contact time necessary to effect the novel process of the present invention need only be of such duration as to insure optimum conversion of the azlactone and acetylenic compound to the corresponding substituted pyrrole. Reaction times of from one hour to several hours are thoroughly practicable. Shorter or longer periods can also be feasibly employed depending upon the temperature (higher temperatures usually permit the use of shorter reaction times), and the manner in which the process is conducted (i.e., batchwise or continuous process). Generally, after the desired temperature has been reached the reaction is essentially complete after from about 1 to about 24 hours, and more preferably from about 1 to about 12 hours.

In practice, the two reactants, one or both of which may be dissolved in an inert solvent, are mixed and heated within the aforesaid temperature range. After the evolution of carbon dioxide has ceased, the reaction mixture is usually worked up by removal of the solvent and recrystallization of the residue from a suitable medium. In general, side reactions are not observed. The yields vary with the reaction system and are usually rather high so that yields of 80 percent are not rare. In order to obtain a high yield of pyrrole derivative, it is desirable to use an excess of the easily obtainable and economically more favorable reactant (i.e. usually the acetylene compound) although this is not absolutely necessary for the successful outcome of the reaction. The excess of acetylene component is easily recovered.

Practically all known azlactones derived from α-amino acids which can themselves be cyclized to azlactones may be used as the azlactone in the reaction. It has been found particularly simple and efficient during the course of the novel reaction not to prepare the azlactone or the mesoionic azlactone separately and then to isolate and purify it, but to produce it in situ in the reaction system in the presence of the other reactant i.e. the unsaturated compound. One can start from aminoacids with primary or secondary amino groups or their N-acyl derivatives and effect the cyclization to the azlactone or its mesoionic derivative with the aid of an acid anhydride. This preferred method of carrying out the novel reaction has the advantage that the isolation of the azlactone or of the mesoionic azlactone is in many cases not only difficult but also inefficient. The azlactone or mesoionic azlactone which has been formed in situ reacts immediately after its formation with the other reactant to give the desired pyrrole derivative. The pyrrole synthesis takes place smoothly even in cases when isolation of the mesoionic azlactone would be impossible.

As hereinbefore mentioned, the substituents of both reactants may be a hydrogen atom or an alkyl, cycloalkyl, arylalkyl, aryl or heterocyclic group and may themselves be substituted. Examples of substituents for this purpose are halogen atoms, the nitro group, ether functions and the hydroxy, arylamino or alkylamino group, an alkyl, cyano or carbalkoxy group. The substituent $R_1$ may also be any natural α-aminoacid residue. Examples of the substituent $R_2$ are the methyl, ethyl, n-pentyl, isopropyl, cyclohexyl, phenyl, β-pyridyl, p-chlorophenyl, p-methoxyphenyl, o-nitrophenyl, β-naphthyl and p-acetaminophenyl groups. The substituents $R_3$ and $R_4$ of the acetylene component may, for example, both be hydrogen in which case the reactant will be acetylene itself or one may use propiolic esters, acetylene dicarboxylic esters, dibenzoylacetylene, phenylpropiolic esters, p-chlorophenylacetyl-ene, 1-phenyl-2-acetylacetylene, 1-hexyne or propargyl acetate.

It was found, surprisingly, that widely differing substituents of the starting materials in no way disturbed the novel reaction between the azlactone and the acetylenic unsaturated compound with the evolution of carbon dioxide. The reactivity is very variable; that of the mesoionic azlactone is an order of magnitude greater than that of the neutral azlactone. This is clearly shown by the reaction rate and the yield.

A noteworthy characteristic of the novel pyrrole synthesis is the fact that during its course, the positions 2 and 4 of the oxazolone-(5), or of its mesoionic derivative, become identical. Thus, corresponding pairs, e.g. the azlactones from N-benzoylalanine and N-acetylphenylglycine (Examples 1a and 1b) as well as the mesoionic azlactones from N-benzoyl-N-methylalanine and N-acetyl-N-methylphenylglycine (Examples 17a and 17b) always yield one and the same pyrrole.

A second aspect of this invention is directed to certain novel substituted pyrrole derivatives which are prepared in accordance with the aforementioned process. These novel compositions are represented by the aforementioned formula wherein $R_1$–$R_5$ have the same values as previously indicated with the provisos that (a) not more than two of said R variables represent hydrogen and (b) if neither $R_3$ or $R_4$ represent an alkoxycarbonyl group, e.g. methoxycarbonyl, ethoxycarbonyl, or the like, then at least two of said R variables must be aryl groups. Also $R_1$ and $R_5$ can together form an alkylene group, e.g.

$$-CH_2-CH_2-CH_2-$$

Table I below illustrates the novel compositions which can be prepared by the reaction of azlactones with acetylenic unsaturated compounds according to the equation:

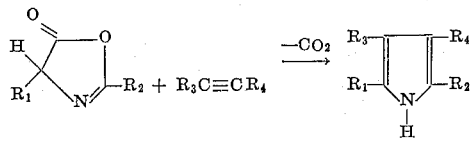

TABLE I

| $R_1$ | $R_2$ | $R_3$ | $R_4$ |
|---|---|---|---|
| $CH_3$ | $C_6H_5$ | $CO_2CH_3$ | $CO_2CH_3$ |
| $C_6H_5$ | $CH_3$ | $CO_2CH_3$ | $CO_2CH_3$ |
| $C_6H_5$ | $C_6H_5$ | $CO_2CH_3$ | $CO_2CH_3$ |
| $C_6H_5$ | $o\text{-}NO_2C_6H_4$ | $CO_2CH_3$ | $CO_2CH_3$ |
| $p\text{-}CH_3OC_6H_4$ | $C_6H_5$ | $CO_2CH_3$ | $CO_2CH_3$ |
| $CH_3$ | $C_6H_5$ | $H$, | $CO_2CH_3$ |
| $CH_3$ | $C_6H_5$ | $H$, | $CO_2CH_3$ |
| $C_6H_5$ | $C_6H_5$ | $H$ | $CO_2CH_3$ |
| $C_6H_5$ | $C_6H_5$ | $C_6H_5$ | $CO_2CH_3$ |

Table II illustrates novel compositions prepared by the reaction of mesoionic oxazoles with acetylene unsaturated compounds according to the equation:

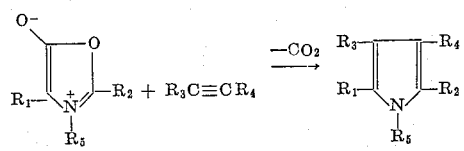

In this table the first column shows whether the reaction was carried out with isolated mesoionic oxazole (procedure A) or with that prepared in situ (procedure B). The preparation in situ of the mesoionic oxazole was achieved by cyclization of an N-acyl-N-alkyl-, N-acyl-N-aryl-, N-alkyl or N-aryl-aminoacid with an acid anhydride. Different acid anhydrides, as for example acetic anhydride, may be used for such cyclization reactions.

TABLE II

| Procedure | $R_1$ | $R_2$ | $R_5$ | $R_3$ | $R_4$ |
|---|---|---|---|---|---|
| A | $C_6H_5$ | $C_6H_5$ | $CH_3$ | $CO_2CH_3$ | $CO_2CH_3$ |
| B | $C_6H_5$ | $C_6H_5$ | $CH_3$ | $CO_2CH_3$ | $CO_2CH_3$ |
| A | $C_6H_5$ | $C_6H_5$ | $CH_3$ | $C_6H_5$ | H |
| B | $C_6H_5$ | $C_6H_5$ | $CH_3$ | $C_6H_5$ | H |
| A | $C_6H_5$ | $C_6H_5$ | $CH_3$ | $C_6H_5$ | $C_6H_5$ |
| B | $C_6H_5$ | $C_6H_5$ | $CH_3$ | $C_6H_5$ | $C_6H_5$ |
| B | $C_6H_5$ | $C_6H_5$ | $CH_3$ | $CO_2CH_3$ | H |
| A | $C_6H_5$ | $C_6H_5$ | $CH_3$ | $CO_2CH_3$ | H |
| B | $C_6H_5$ | $C_6H_5$ | $CH_3$ | $C_6H_5$ | $CO_2C_2H_5$ |
| A | $C_6H_5$ | $C_6H_5$ | $CH_3$ | $n\text{-}C_4H_9$ | H |
| B | $CH_3$ | $CH_3$ | $C_6H_5$ | $CO_2CH_3$ | $CO_2CH_3$ |
| B | $CH_3$ | $CH_3$ | $C_6H_5$ | $C_6H_5$ | $CO_2C_2H_5$ |
| B | $CH_3$ | $C_6H_5$ | $CH_3$ | $C_6H_5$ | $C_6H_5$ |
| B | $CH_3$ | $C_6H_5$ | $CH_3$ | H | $CO_2CH_3$ |
| B | $C_6H_5$ | $CH_3$ | $CH_3$ | $CO_2CH_3$ | $CO_2CH_3$ |
| B | $C_6H_5$ | $CH_3$ | $CH_3$ | $CO_2C_2H_5$ | $C_6H_5$ |
| B | $C_6H_5$ | $CH_3$ | $CH_3$ | ($C_6H_5$, H) | |
| B | H | $CH_3$ | $CH_3$ | $CO_2CH_3$ | $CO_2CH_3$ |
| B | H | H | $C_6H_5$ | $CO_2CH_3$ | $CO_2CH_3$ |
| B | * | $CH_3$ | * | $CO_2CH_3$ | $CO_2CH_3$ |

\* $R_1$ and $R_5$ = —($CH_2$)$_3$—(ring closure).

As hereinbefore indicated, the starting materials employed in the present invention are the azlactones (or mesoionic azlactones) and acetylenic unsaturated compounds. Practically all known azlactones derived from α-amino acids which can themselves be cyclized to azlactones can be employed in the practice of the invention. Moreover, a wide variety of substituted acetylenes may be used in the reaction, even those containing bulky substituents which do not hinder the pyrrole-forming reaction.

The novel compositions of this aspect of the invention are a useful class of compounds having significant and unobvious properties in various fields of application. Due to the heterocyclic structure, the substituted pyrroles of this invention are useful as intermediates in the manufacture of a variety of products which themselves are useful in pharmaceutical, agricultural, or other fields. For example, hydrogenated derivatives, the pyrrolidines, have been found useful in the preparation of aging inhibitors, vulcanization accelerators, insecticides, and the like.

The following examples are illustrative:

EXAMPLE 1

*Preparation of dimethyl 2-phenyl-5-methylpyrrole-3,4-dicarboxylate*

(a) 1.75 grams (10 millimoles) 2-phenyl-4-methyl-oxazolone-5 were refluxed with 2.84 grams (20 millimoles) dimethyl acetylenedicarboxylate in 10 cubic centimeters xylene. The evolution of carbon dioxide had stopped after 90 minutes and amounted to 10 millimoles. The solvent and excess acetylenedicarboxylic ester were distilled off in vacuo. The residue crystallized from methanol as compact colorless prisms. There was obtained 1.95 grams of product having a melting point of 125–127° C. This represented 72 percent of the theoretical yield. Upon analysis the product had the following composition. Calculated for $C_{15}H_{15}NO_4$ (molecular weight 273.3): C, 65.92; H, 5.53; N, 5.13. Found C, 65.14; H, 6.28; N, 4.92. Alkaline hydrolysis gave the free dicarboxylic acid which was mixed with quicklime and distilled at a pressure of 15 millimeters of mercury. The product of decarboxylation melted at 99° C. and was found to be identical with an authentic sample of 2-phenyl-5-methylpyrrole.

(b) In situ: 1.93 grams (10 millimoles) N-acetylphenylglycine and 5.0 cubic centimeters (41 millimoles) dimethyl acetylenedicarboxylate were heated for 15 minutes with 10 cubic centimeters acetic anhydride in a bath at 130° C. when 10 millimoles carbon dioxide were evolved. The clear light brown solution was concentrated at a pressure of 11 milliliters of mercury and the residue crystallized from methanol. There was obtained 2.14 grams of product having a melting point of 127–128° C. This represented 78 percent of the theoretical yield.

(c) In situ: 1.51 grams (10 millimoles) phenylglycine were reacted with dimethyl acetylenedicarboxylate and acetic anhydride and worked up as described under (a). There was obtained 2.04 grams of product having a melting point of 127–128° C. This represented 75 percent of the theoretical yield.

EXAMPLE 2

*Preparation of dimethyl 2,5-diphenylpyrrole-3,4-dicarboxylate*

(a) 1.18 grams of 2,4-diphenyl-oxazolone (5.0 millimoles) were reacted with 1.42 grams of acetylene dicarboxylic acid dimethyl ester (10 millimoles) in 10 cubic centimeters of xylene for 2 hours at 100° C. The procedure described in Example 1 produced, from methanol, 1.39 grams of a colorless product having a melting point of 149–150° C. This represented 83 percent of the theoretical yield.

(b) In situ: 19.1 grams of N-benzoyl-phenylglycine (75 millimoles) were carefully heated on a steam bath for 15 minutes together with 21.3 grams of acetylene dicarboxylic acid dimethyl ester (150 millimoles) and 30 cubic centimeters of acetic anhydride. Solvent and excess acetylene dicarboxylic ester were distilled off in vacuo; the residue crystallized out from methanol in firm colorless crystals. There was obtained 23.2 grams of product having a melting point of 145–147° C. This represented 92 percent of the theoretical yield. After re-dissolving and crystallizing from methanol the pure compound melted at 149–150° C. Upon analysis the product had the following composition. Calculated for $C_{20}H_{17}NO_4$ (molecular weight 335.4): C, 71.63; H, 5.11; N, 4.18. Found C, 71.75; H, 5.25; N, 4.29. The alkaline hydrolysis of the product obtained furnished the free dicarboxylic acid. The thermal decarboxylation of the barium salt resulted in 2,5-diphenyl-pyrrole with a melting point of 141° C., identical with a product independently synthesized from 1,2-dibenzoyl-ethane.

EXAMPLE 3

*Preparation of 2-[o-nitrophenyl]-5-phenylpyrroledicarboxylic acid-3-(3,4)-dimethyl ester*

0.703 gram of 2-phenyl-4-[o-nitrophenyl]-oxazolone-(5) (2.5 millimoles) was heated with 5.0 millimoles of acetylene dicarboxylic acid dimethyl ester in 5 cubic centimeters of xylene for 4 hours to 100° C. and for 2 hours to 120° C. After removal of the xylene in vacuo the residue crystallized out from ether/petroleum ether. 0.08 grams of the crude product with a melting point of 147–157° C. yielded, upon re-crystallization from a little ethanol, 0.57 gram of a light-yellow product with a melting point of 158–160° C. This represented 60 percent of the theoretical yield. The infrared spectrum showed the NH— bands at 3.07 mμ and the bands of the nitro groups at 6.57 and 7.43 mμ. Upon analysis the product had the following composition. Calculated for $C_{20}H_{16}N_2O_6$ (molecular weight 380.4): C, 63.15; H, 4.24; N, 7.37. Found C, 63.62; H, 4.24; N, 7.27.

EXAMPLE 4

*Preparation of 2-[p-methoxyphenyl]-5-phenylpyrrole dicarboxylic acid-3-(3,4)-dimethyl ester*

(a) 0.667 grams of 2-[p-methoxyphenyl]-4-oxazolone (2.5 millimoles) was heated with 5.0 millimoles of acetylene dicarboxylic acid dimethyl ester in 5 cubic centimeters of xylene for 20 hours to 110° C. After distilling off the xylene and the excess acetylene dicarboxylic ester the residue was purified by adsorption on aluminum oxide. Since the ester did not crystallize, the dicarboxylic ester was saponified by reflux boiling for 3 hours with 2.7 grams of potassium hydroxide in 10 cubic centimeters of methanol. After decanting into water extraction was made with ether. Acidification of the aqueous phase yielded 550 milligrams of dicarboxylic acid as a rapidly solidifying oil. This was mixed with 1 gram of barium hydroxide and distilled under 0.001 torr. There was obtained 0.17 gram of product having a melting point of 162–163° C. This represented 27 percent of the theoretical yield. The infrared spectrum and the analysis confirm the constitution of a 2-[p-methoxy phenyl]-5-phenylpyrrole. Upon analysis the product had the following composition. Calculated for $C_{17}H_{15}NO$ (molecular weight 249.3): C, 81.90; H, 6.06; N, 5.62. Found C, 81.87; H, 6.15; N, 5.47.

(b) In situ preparation of 2-phenyl-5-[4-methoxyphenyl] - pyrrole - dicarboxylic acid-(3,4)-dimethyl ester: 2.85 grams of N-anisoyl-phenylglycine (10 millimoles), 7:1 grams of acetylene dicarboxylic acid dimethyl ester (50 millimoles) and 10 cubic centimeters of acetic anhydride were heated for 30 minutes to 120° C., concentrated in a water jet vacuum and the residue was subjected to high vacuum distillation. At a temperature of between 260 and 275° C. (bath temperature) and 0.02 torr there were obtained 3.59 grams (98 percent yield) of a brownish glass which passed upon renewed distillation at 260–265° C. (bath temperature) and 0.02 torr. Upon analysis the product had the following composition. Calculated for $C_{21}H_{19}NO_5$ (molecular weight 365.4): C, 69.03; H, 5.24; N, 3.83. Found C, 69.06; H, 5.21; N, 4.05.

EXAMPLE 5

Preparation of 2-phenyl-5-methylpyrrole carboxylic acid-(3)- or -(4)-methyl ester (a) From isolated azlactone: The pyrrole derivative obtained from 0.876 gram of 2-phenyl-5-methyl oxazolone (2.5 millimoles) and 1.68 grams of propiolic acid methyl ester (20 millimoles) after reflux boiling for three days in 12 cubic centimeters of xylene could be distilled in a high vacuum but displayed no tendency toward crystallization. Consequently, as in Example 4, the pyrrole carboxylic ester was subjected to alkaline hydrolysis and the carboxylic acid was then decarboxylated. The 21 percent yield of 2-phenyl-5-methylpyrrole was identical with the pyrrole that had been obtained by the decomposition of the 2-phenyl-5-methylpyrrole-dicarboxylic acid acid-(3,4)-dimethyl ester.

(b) From azlactone formed in situ: 1.93 grams of N-benzoyl-alanine (10 millimoles) were heated with 4 cubic centimeters of acetic anhydride for 2 minutes on the steam bath whereby a clear solution was obtained. After cooling to 50° C. 8.4 grams of propiolic acid methyl ester (100 millimoles) were added and the mixture was then boiled under reflux for 9 hours resulting in the release of 9.8 millimoles of carbon dioxide with a half-life period of 45 minutes. The finished treatment of the clear, brown solution by distillation produced at 150–180° C. (bath temperature) and 0.04 torr. 210 grams of a nearly colorless oil (98 percent yield) which went over upon renewed distillation at 150–160° C. (bath temperature) and 0.04 torr.

EXAMPLE 6

Preparation of 2.5-diphenylpyrrole carboxylic acid-(3)-methyl ester 2.37 grams of 2,4-diphenyl oxazolone (10 millimoles) 5.0 cubic centimeters of propiolic acid methyl ester and 5 cubic centimeters of xylene were heated for 2 hours to 110° C. with the release of 9.5 millimoles of carbon dioxide. The clear solution was concentrated in vacuo and by recrystallization of the residue in methanol 2.11 grams of colorless crystals (76 percent yield) were obtained having a melting point of 171–173° C. Recrystallization from methanol produced the pure pyrrole derivative with a melting point of 172–173° C. Upon analysis the product had the following composition. Calculated for $C_{18}H_{15}NO_2$ (molecular weight 277.3): C 77.96; H, 5.45; N. 5.05. Found C, 77.73; H, 5.52; N, 5.28. Also in this case conversion into the 2,5-diphenylpyrrole with a melting point of 141° C. served to prove the structure.

EXAMPLE 7

Preparation of 2,3,5-triphenyl-4-acetyl-pyrrole 1.18 grams of 2,4-diphenyl-oxazolone-(5) (5.0 millimoles) were reacted with 1.44 grams of 2-acetyl-phenyl acetylene (10 millimoles) for 20 hours at a temperature of 125° C. Following the same procedure the benzene solution was purified in an aluminum oxide column. Upon dissolving and crystallizing from petroleum ether there was obtained 0.21 gram of the light-yellow pyrrole ketone (12 percent yield) with a melting point of 145–147° C. Upon analysis the product had the following composition. Calculated for $C_{24}H_{19}NO$ (molecular weight 337.4): C, 85.43; H, 5.68; N, 4.15. Found C, 85.74; H, 5.72; N, 4.38.

EXAMPLE 8

Preparation of 2,5-diphenyl-1-methylpyrrole-dicarboxylic acid-(3,4)-dimethyl ester (a) From isolated anhydro-5-hydroxy-3-methyl-2,4-diphenyloxazolium hydroxide: When mixing the suspension of 2.51 grams of the mesoionic azlatone (10 millimoles) with 25 cubic centimeters of xylene and adding 4 cubic centimeters of acetylene dicarboxylic acid dimethyl ester the reaction vessel had to be cooled in ice water because of the exothermic reaction in order to prevent a too violent evolution of carbon dioxide. After 5 minutes the now clear, colorless solution was heated for another 5 minutes on the steam bath and concentrated under 11 torrs. There was obtained 3.32 grams of product having a melting point of 147–148° C. This represented 95 percent of the theoretical yield.

(b) From anhydro - 5-hydroxy-3-methyl-2,4-diphenyl-oxazolium hydroxide formed in situ: 0.538 gram of N-benzoyl - N-methyl-phenylglycine, 2.0 millimoles) dissolved within 30 minutes in the mixture of 4 cubic centimeters of acetic anhydride and 0.568 gram of acetylene dicarboxylic acid dimethyl ester (4.0 millimoles) at 20° C. under evolution of carbon dioxide. After another 30 minutes at 100° C. the solution was treated as described above; recrystallization of the pale yellow residue from benzene/cyclohexane resulted in 0.646 gram of product having a melting point of 147–148° C. This represented 92 percent of the theoretical yield. Upon analysis the product had the following composition. Calculated for $C_{21}H_{19}NO_4$ (molecular weight 349.4): C, 72.19; H, 5.48; N, 4.01. Found C, 72.20; H, 5.65; N, 4.00. The anhydro - 5 - hydroxy-3-methyl-2,4-diphenyloxazolium hydroxide used as starting material may be prepared in the following manner: A suspension of 30.0 grams of N-benzoyl-N-methyl-phenylglycine and 70 cubic centimeters of acetic anhydride are heated under shaking for 2 minutes to 55° C. bath temperature and the clear, yellow solution is rapidly concentrated under 0.3 torr. to a yellow, crystalline residue. After mixing with 50 cubic centimeters absolute ether suction is applied, the product is rinsed with ether and the residue is suspended in 75 cubic centimeters of absolute acetonitrile. The suspension was heated to boiling, quickly cooled to room temperature, treated with 50 cubic centimeters absolute ether, cooled in an ice/salt bath, filtered, washed with absolute ether and dried in a vacuum desiccator connected to an oil pump. By rapid concentration of the mother liquor at a pressure of 11 millimeters of mercury and intense cooling, a further portion could be obtained pure. There was obtained 24.3 grams of product having a melting point of 152° C. This represented 90 percent of the theoretical yield. Upon analysis the product had the following composition. Calculated for $C_{16}H_{13}NO_2$ (molecular weight 251.3): C, 76.49; H, 5.22; N, 5.58. Found C, 76.48; H. 5.35; N, 5.46.

EXAMPLE 9

*Preparation of 2,3,5-triphenylpyrrole*

(a) From isolated mesoionic azlactone: 0.502 gram (2.0 millimoles) anhydro-5-hydroxy-3-methyl-2,4-diphenyloxazolium hydroxide was warmed in an 75° C. bath with 4.08 grams (40 millimoles) phenylacetylene and 4 cubic centimeters dry benzene. 1.56 millimoles carbon dioxide were liberated within an hour. After a further 30 minute refluxing, the originally yellow solution had become colorless. The solvent was distilled off and the residue recrystallized from ethyl acetate. There was obtained 410 milligrams of product having a melting point of 178–179° C. This represented 66 percent of the theoretical yield. Upon analysis the product had the following composition. Calculated for $C_{23}H_{19}N$ (molecular weight 309.4): C, 89.28; H, 6.19; N, 4.53. Found C, 89.54; H, 6.07; H, 4.46.

(b) From mesoionic azlactone prepared in situ: 2.0 grams (7.44 millimoles) N-benzoyl-N-methylphenylglycine and 5 cubic centimeters (45.5 millimoles) phenylacetylene were heated for one hour at 90–100° C. with 10 cubic centimeters acetic anhydride when 91 percent carbon dioxide was liberated. The reaction solution concentrated under a water pump vacuum crystallized on cooling. Recrystallization from ethyl acetate gave 2.15 grams (93 percent yield) colorless pyrrole derivative with a melting point of 178–179° C. identical with the preparation obtained by method (a).

EXAMPLE 10

*Preparation of 2,3,4,5-tetraphenyl-1-methylpyrrole*

(a) From isolated mesoionic azlactone: 2.13 grams (8.5 millimoles) pure anhydro-5-hydroxy-3-methyl-2,4-diphenyloxazolium hydroxide were heated with 4.00 grams (22.5 millimoles) diphenylacteylene in 10 cubic centimeters xylene for 3 hours at 100–110° C. The carbon dioxide evolution amounted to 5.9 millimoles (70 percent yield) and was not increased by a final hour's heating at 130° C. After removal of solvent 0.35 gram of the desired product crystallized from an ether/petroleum ether digest; 3.6 grams tolane were recovered with methanol from the residue from the evaporation of the mother liquor. This pyrrole derivative melted at 209–211° C. after recrystallization from acetonitrile (11 percent yield). Upon analysis the product had the following composition. Calculated for $C_{29}H_{23}N$ (molecular weight 385.5): C, 90.35; H, 6.01; N, 3.63. Found C, 90.30; H, 6.11; N, 3.53.

(b) From the mesoionic azlactone prepared in situ: 5.38 grams (20.0 millimoles) N-benzoyl-N-methylphenylglycine were heated in 20 cubic centimeters anhydride with 10 grams (56 millimoles) tolane for 8 hours at 130° C. 18.8 millimoles carbon dioxide were liberated with a half reaction time of 25 minutes. After removal of the solvent, the excess diphenylacetylene was distilled off at 120–130° C. and at a pressure of 0.01 millimeter of mercury. The residue crystallized from methanol. There was obtained 1.62 grams of product having a melting point of 207–209° C. This represented 21 percent of the theoretical yield. Recrystallization gave a product whose melting point was the same as that of the product prepared by method (a).

EXAMPLE 11

*Preparation of methyl 2,5-diphenyl-1-methylpyrrole-3-carboxylate*

(a) From the mesoionic azlactone prepared in situ: 3.20 grams (11.9 millimoles) N-benzoyl-N-methylphenylglycine were dissolved in 2.04 grams (24.3 millimoles) methyl propiolate and 10 cubic centimeters acetic anhydride at 70° C. when 70 percent of the expected volume of carbon dioxide was liberated within 3 minutes. After the first runnings of methyl propiolate, acetic acid and acetic anhydride, the oily pyrrole derivative distilled next at 190° C. and at a pressure of 0.003 millimeter of mercury. The distillate crystallized on being triturated with ether, and after recrystallization from cyclohexane, melted at 98–100° C. (90 percent yield).

(b) From isolated mesoionic azlactone: A suspension of 10.0 millimole anhydro-5-hydroxy-3-methyl-2,4-diphenyloxazlium hydroxide in 20 cubic centimeters waterfree benzene was cooled in ice and 20 millimoles methyl propiolate were slowly added causing a reaction with evolution of carbon dioxide. The reaction was completed by removal of the external cooling and warming to 50° C. for 5 minutes. After removal of the benzene and excess methyl propiolate by distillation, the residue crystallized from methanol. There was obtained 2.75 grams of product having a melting point of 99–100° C. This represented 95 percent of the theoretical yield. Upon analysis the product had the following composition. Calculated for $C_{19}H_{17}NO_2$ (molecular weight 291.3): C, 78.33; H, 5.88; N, 4.81. Found C, 78.25; H, 5.68; N, 5.11.

EXAMPLE 12

*Preparation of ethyl 2,3,5-triphenyl-1-methylpyrrole-4-carboxylate from mesoionic azlactone prepared in situ*

On warming 2.93 grams (10.9 millimoles) N-benzoyl-N-methylphenylglycine with 4.09 grams (23.5 millimoles) ethyl phenylpropiolate in 10 cubic centimeters acetic anhydride in a 50° C. bath, 10 millimoles carbon dioxide were liberated within 85 minutes; the reaction was completed during 30 minutes at 105° C. On cooling and standing for several hours, 3.60 grams (87 percent yield) granular crystals at a melting point of 165–167° C. of the desired pyrrole derivative separated. A preparation recrystallized from benzene/cyclohexane melted at 170–171.5° C. Upon analysis the product had the following composition. Calculated for $C_{26}H_{23}NO_2$ (molecular weight 381.5): C, 81.86; H, 6.08; N, 3.67. Found C, 82.50; H, 6.43; N, 3.80.

EXAMPLE 13

*Preparation of 2,5 - diphenyl-1-methyl-3-n-butyl-pyrrole from isolated mesoionic azlactone*

2.51 grams (10.0 millimoles) anhydro-5-hydroxy-3-methyl-2,4-diphenyoxazolium hydroxide were refluxed for 2 hours in 10 cubic centimeters n-hex-1-yne with evolution of 9.5 millimoles carbon dioxide. The product distilled at 160–165° C. (bath temperature) and at a pressure of 0.02 millimeter of mercury. There was obtained 2.35 grams of product which represented 81 percent of the theoretical yield as pale yellow oil. Upon analysis the product had the following composition. Calculated for $C_{21}H_{23}N$ (molecular weight 289.4): C, 87.15; H, 8.01; N, 4.84. Found C, 86.41; H, 7.99; N, 4.89.

EXAMPLE 14

*Preparation of dimethyl 1-phenyl-2,5-dimethylpyrrole-3,4-dicarboxylate from anhydro-5-hydroxy-3-phenyl-2,4-dimethyloxazolium hydroxide prepared in situ*

414 milligrams (2.0 millimoles) N-acetyl-N-phenylalanine reacted with 568 milligrams (4.0 millimoles) dimethyl acetylenedicarboxylate in 4 cubic centimeters acetic anhydride with 50° C. After 5 hours the mixture was concentrated in vacuo. 457 milligrams pyrroledicarboxylic ester crystallized as long colorless needles at a melting point of 87–88° C. (80 percent yield) from a little methanol. Upon analysis the product had the following composition. Calculated for $C_{16}H_{16}NO_4$ (molecular weight 287.3): C, 66.88; H, 5.97; N, 4.88. Found C, 67.15; H, 6.16; N, 5.02.

EXAMPLE 15

*Preparation of ethyl 1,3-diphenyl-2,5-dimethylpyrrole-4-carboxylate from anhydro-5-hydroxy-2,4-dimethyl-3-phenyloxazolium hydroxide formed in situ*

3.07 grams (14.8 millimoles) N-acetyl-N-phenylalanine heated with 6.19 grams (35.5 millimoles) ethyl phenylpropiolate and 10 cubic centimeters acetic anhydride for 6 hours at 80° C. liberated more than 14 millimoles carbon dioxide. The product was distilled at 170–200° C. (bath temperature) and at a pressure of 0.02 millimeter of mercury. 4.44 grams distillate gave, on digestion with petroleum ether. There was obtained 3.78 grams of product having a melting point of 77–79° C. This represented 88 percent of the theoretical yield. After recrystallization from cyclohexane the compound melted at 82–84° C. Upon analysis the product had the following composition. Calculated for $C_{21}H_{21}NO_2$ (molecular weight 319.4): C, 78.96; H, 6.63; N, 4.39. Found C, 79.08; H, 6.42; N, 4.55.

EXAMPLE 16

*Preparation of 1,3-diphenyl-2,5-dimethylpyrrole from anhydro - 5 - hydroxy - 2,4-dimethyl-3-phenyloxazolium hydroxide formed in situ*

2.36 grams (11.4 millimoles) N-acetyl-N-phenylalanine were heated for 4 hours at 110–114° C. with 3.73 grams (36.5 millimoles) phenylacetylene and 8 cubic centimeters acetic anhydride; the calculated amount of carbon dioxide was liberated after 3 hours. The residue of the dark solution gave, on distillation at 150–170° C. and at a pressure of 0.001 millimeter of mercury, 2.10 grams distillate. By careful renewed fractionation the first runnings of N-acetyl-N-phenylaminoacetone were removed. The oily pyrrole was obtained in an 80 percent yield. Upon analysis the product had the following composition. Calculated for $C_{18}H_{17}N$ (molecular weight 247.2): C, 87.44; H, 6.93; N, 5.66. Found C, 86.82; H, 6.90; N, 5.60.

EXAMPLE 17

*Preparation of dimethyl 2-phenyl-1,5-dimethylpyrrole-3,4-dicarboxylate from mesoionic azlactone formed in situ*

(a) A mixture of 0.710 gram (5.0 millimoles) dimethyl acetylenedicarboxylate and 5 cubic centimeters acetic anhydride was treated with 0.517 gram (2.5 millimoles) N-benzoyl-N-methylalanine. 80 percent of the calculated amount of carbon dioxide was given off at room temperature. After a further hour's warming at 80° C. the mixture was concentrated, first under a water-pump vacuum and finally at a pressure of 0.001 millimeter of mercury up to a bath temperature of 100° C. There was obtained 595 milligrams of product having a melting point of 94–95° C. This represented 83 percent of the theoretical yield. Upon analysis the product had the following composition. Calculated for $C_{16}H_{17}NO_4$ (molecular weight 287.3): C, 66.88; H, 5.97; N, 4.88. Found C, 66.75; H, 5.83; N, 5.08.

(b) The analogous reaction of 10 millimoles N-acetyl-N-methylphenylglycine with 16.3 millimoles dimethyl acetylenedicarboxylate in 5 cubic centimeters acetic anhydride cooled to 10° gave the same pyrrole derivative in 90 percent yield. Melting point of 94–95° C., thus no difference from the product prepared under (a). The infrared spectra also confirmed the identity.

EXAMPLE 18

*Preparation of ethyl 1,2-dimethyl-3,5-diphenylpyrrole-4-carboxylate from mesoionic azlactone formed in situ*

3.29 grams (15.9 millimoles) N-acetyl-N-methylphenylglycine reacted quickly at 65–70° C. with 6.35 grams (36.5 millimoles) ethyl phenylpropiolate in 10 cubic centimeters acetic anhydride, when 14.4 millimoles carbon dioxide were given off within 22 minutes. The solution was evaporated at 15 millimeters pressure and a bath temperature rising to 140° C. There was obtained 3.78 grams of product having a melting point of 117–119° C. This represented 75 percent of the theoretical yield. Upon analysis the product had the following composition. Calculated for $C_{21}H_{21}NO_2$ (molecular weight 319.4): C, 78.96; H, 6.63; N, 4.39. Found C, 78.93; H, 6.50; N, 4.58.

EXAMPLE 19

*Preparation of 1,2-dimethyl-3,5- or 1,2-dimethyl-4,5-diphenylpyrrole from anhydro-5-hydroxy-2,3-dimethyl-4-phenyloxazolium hydroxide*

6.00 grams (28.9 millimoles) N-acetyl-N-methylphenylglycine were heated with 13.9 grams (135 millimoles) phenylacetylene and 4.60 cubic centimeters (45 millimoles) acetic anhydride for 70 minutes at 70° C. On cooling, 4.03 grams crystals with a melting point of 144–145° C. precipitated; a further 1.45 grams of the same compound were isolated from the motor liquor. Recrystallization from ethanol did not change the melting point (77 percent yield). Upon analysis the product had the following composition. Calculated for $C_{18}H_{17}N$ (molecular weight 247.4): C, 87.44; H, 6.93; N, 5.66. Found C, 87.78; H, 7.08; N, 5.65.

EXAMPLE 20

*Preparation of dimethyl 1,2-dimethylpyrrole-3,4-dicarboxylate from anhydro-5-hydroxy-2,3-dimethyloxazolium hydroxide formed in situ*

0.89 gram (10.0 millimoles) sarcosine were heated with 5.0 cubic centimeters (41 millimoles) dimethyl acetylenedicarboxylate and 15 cubic centimeters anhydride for 30 minutes at 110° C. whereby 9.8 millimoles carbon dioxide were evolved. The solution was concentrated under a waterpump vacuum. There was obtained 0.77 gram of product having a melting point of 88–89° C. This represented 37 percent of the theoretical yield. Upon analysis the product had the following composition. Calculated for $C_{10}H_{13}NO_4$ (molecular weight 212.2): C, 56.87; H, 6.20; N, 6.63. Found C, 57.49; H, 6.41; N, 6.42.

EXAMPLE 21

*Preparation of dimethyl 1-phenylpyrrole-3,4-dicarboxylate from anhydro-5-hydroxy-3-phenyloxazolium hydroxide formed in situ*

The suspension of 1.79 grams (10.0 millimoles) N-formyl-N-phenylglycine in 5.0 cubic centimeters (41 millimoles) dimethyl acetylenedicarboxylate and 10 cubic centimeters acetic anhydride was heated for 2 hours in a bath at 110° C. whereby a clear light brown solution was formed and 9.8 millimoles carbon dioxide were liberated. There was obtained 2.37 grams of product having a melting point of 117–118° C. This represented 92 percent of the theoretical yield. Upon analysis the product had the following composition. Calculated for $C_{14}H_{13}NO_4$ (molecular weight 259.3): C, 64.86; H, 5.05; N, 5.40. Found: C, 64.96; H, 5.11; N, 5.34.

EXAMPLE 22

*Preparation of dimethyl 1,2-dihydro-5-methyl-3H-pyrrolizine-6,7-dicarboxylate from the mesoionic azlactone formed in situ*

A solution of 1.15 grams (10.0 millimoles) L-proline and 5.8 grams dimethyl acetylenedicarboxylate in 10 cubic centimeters anhydride was heated for 1 hour at 130° C. whereby 9.8 millimoles carbon dioxide were evolved. After concentration under a water pump vacuum 1.79 grams colorless compact needles crystallized from methanol. After recrystallization from 80 percent methanol the melting point was 102–103° C. and 76 percent of the theoretical yield. Upon analysis the product had the following composition. Calculated for $C_{12}H_{15}NO_4$ (molecular weight 237.3): C, 60.75; H, 6.37; N, 5.90. Found C, 60.53; H, 6.64; N, 5.95.

EXAMPLE 23

*Preparation of 2-cyclohexyl-5-phenyl-pyrrole-dicarboxylic acid-(3,4)-dimethyl ester*

2.61 grams of N-cyclohexanoyl-phenyl-glycine (10 millimoles), 5.0 cubic centimeters of acetylene-dicarboxylic acid dimethyl ester, 5 cubic centimeters of acetic anhydride and 5 cubic centimeters of xylene were heated for 30 minutes to 130° C. and the clear solution was concentrated under 11 torrs. There was obtained 3.17 grams of product having a melting point of 143–145° C. This represented 93 percent of the theoretical yield. Upon analysis the product had the following composition. Calculated for $C_{20}H_{23}NO_4$ (molecular weight 341.4): C, 70.36; H, 6.79; N, 4.10. Found C, 70.66; H, 6.90; N, 3.87.

EXAMPLE 24

*Preparation of 2-(α-naphthyl)-5-phenyl-pyrrole-dicarboxylic acid-(3,4)-dimethyl ester*

1.53 grams of N-(α-naphthoyl)-phenyl-glycine (5 millimoles), 7.10 grams of acetylene-dicarboxylic acid dimethylester (50 millimoles) and 5 cubic centimeters of acetic anhydride were heated for 15 minutes to 110–120° C., concentrated under 11 torrs and the residue was crystallized from methanol. There was obtained 1.63 grams of product having a melting point of 157–160° C. This represented 85 percent of the theoretical yield. After double recrystallization the colorless, firm crystals showed a melting point of 160–161° C. The infrared spectrum displays the NH bands at 3290 cm.$^{-1}$ and the bands of the carboxylic ester groups at 1712$^{-1}$ and 1695 cm.$^{-1}$. Upon analysis the product had the following composition. Calculated for $C_{24}H_{19}NO_4$ (molecular weight 385.4): C, 74.79; H, 4.97; N, 3.64. Found C, 75.18; H, 5.10; N, 3.87.

EXAMPLE 25

*Preparation of 2-phenyl-5-p-chlorobenzene-pyrroledicarboxylic acid-(3,4)-dimethyl ester*

A mixture of 2.90 grams of N-p-benzoyl chloride-phenylglycine (10 millimoles), 7.10 grams of acetylene dicarboxylic acid dimethyl ester (50 millimoles) and 5 cubic centimeters of acetic anhydride were heated for 10 minutes to 100° C. (bath temperature) causing the liberation of 10 millimoles of carbon dioxide in an exothermic reaction. After concentration of the clear solution at 11 torrs, the residue was dissolved in methanol. There was obtained 3.84 grams of product having a melting point of 142–144.5° C. This represented 99.6 percent of the theoretical yield. The pyrrole derivative was recrystallized from methylene chloride/methanol with a melting point of 143–144° C. Upon analysis the product had the following composition. Calculated for

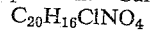

(molecular weight 369.8): C, 64.96; H, 4.36; N, 3.78. Found C, 64.75; H, 4.30; N, 3.93.

EXAMPLE 26

*Preparation of 2,5-diphenyl-1-methylpyrrole*

2.51 grams of anhydro-5-hydroxy-3-methyl-2,4-diphenloxazolium hydroxide (10 millimoles), about 1 gram of acetylene (condensed in a refrigerating bath) and 20 cubic centimeters of xylene were heated for 10 hours to 115–130° C. in a sealed tube and the solvent was subsequently distilled off in vacuo. 2.23 grams of colorless, firm cubes remained as residue having a crude melting point of 201–204° C. After double recrystallization from xylene the colorless leaves melted at 204–205° C. The pyrrole derivative proved to be identical with an authentic preparation of 2,5-diphenyl-1-methylpyrrole with 96 percent of the theoretical yield. Upon analysis the product had the following composition. Calculated for $C_{17}H_{15}N$ (molecular weight 233.3): C, 87.52; H, 6.48; N, 6.00. Found C, 88.19; H, 6.74; N, 5.88.

EXAMPLE 27

*Preparation of 1-phenyl-2-methylpyrrole-dicarboxylic acid-(3,4)-dimethylester*

1.93 grams of N-acetyl-N-phenylglycine (10 millimoles), 7.10 grams of acetylene-dicarboxylic acid-dimethyl ester (50 millimoles) and 4 cubic centimeters of acetic anhydride were heated for 90 minutes to 100° C. and the clear light brown solution was concentrated under 11 torrs. The high-vacuum distillation of the residue produced at 170–190° C. (bath temperature) and 0.02 torr. 2.58 grams of a light yellow, viscous oil which after dissolving and crystallizing from methanol gave 2.08 grams of colorless crystals. The product had a melting point of 66–68° C. This represented 76 percent of the theoretical yield. After double recrystallization from 80 percent methanol the colorless cubes melted at 69–70° C. Upon analysis the product had the following composition. Calculated for $C_{15}H_{15}NO_4$ (molecular weight 273.3): C, 65.92; H, 5.53; N, 5.13. Found C, 6.07; H, 5.65; N, 5.06.

EXAMPLE 28

*Preparation of 1,2,5-trimethylpyrrole-dicarboxylic acid-(3,4)-dimethyl ester*

1.03 grams of N-methyl-alanine (10 millimoles) 4.0 cubic centimeters of acetylene-dicarboxylic acid dimethyl ester and 6 cubic centimeters of acetic anhydride were heated for 20 minutes to 120° C. with the liberation of 9.8 millimoles of carbon dioxide. The clear solution was concentrated under 11 torrs and the residue was crystallized from methanol producing 1.96 grams of colorless needles of the pyrrole compound (87 percent yield) which upon recrystallization from methanol melted at 152–153° C. Upon analysis the product had the following composition. Calculated for $C_{11}H_{15}NO_4$ (molecular weight 225.3): C, 58.65; H, 6.71; N, 6.22. Found C, 58.60; H, 6.71; N, 6.47.

EXAMPLE 29

*Preparation of 1-methyl-2-cyclohexyl-5-phenyl pyrrole-dicarboxylic acid-(3,4)-dimethyl ester*

The mixture of 2.75 grams of N-cyclohexanoyl-N-methyl-phenylglycine (10 millimoles), 5 cubic centimeters of acetylene dicarboxylic acid dimethyl ester, 5 cubic centimeters acetic anhydride and 5 cubic centimeters xylene was heated until carbon dioxide was evolved in a bath of 90° C. After removal of the bath the reaction was permitted to go to completion and thereafter heating was resumed for 15 minutes to 100° C. (bath temperature). The solvent and the excess of acetylene dicarboxylic ester were distilled off at 11 torrs and the residue was crystallized from methanol. There was obtained 3.49 grams of product having a melting point of 153–154° C. This represented 98 percent of the theoretical yield. Upon analysis the product had the following composition. Calculated for $C_{21}H_{25}NO_4$ (molecular weight 355.4): C, 70.97; H, 7.09; N, 3.94. Found C, 71.26; H, 7.01; N, 4.00.

EXAMPLE 30

*Preparation of 2,5-dimethyl-1-cyclohexyl-pyrrole-dicarboxylic acid-(3-4)-dimethyl ester*

2.13 grams of N-acetyl-N-cyclohexyl-alanine (10 millimoles), 5 cubic centimeters of acetylene dicarboxylic acid dimethyl ester and 5 cubic centimeters of acetic anhydride were heated to 80° C. until evolution of carbon dioxide began. Care was taken to prevent a too violent reaction by intermittent cooling. After 10 minutes the evolution of carbon dioxide was finished giving 10 millimoles. The product was concentrated under 11 torrs and the residue crystallized from methanol. There was obtained 2.85 grams of product having a melting point of 74–76° C. This represented 97 percent of the theoretical yield. Upon analysis the product had the following composition. Calculated for $C_{16}H_{23}NO_4$ (molecular weight 293.4): C, 65.51; H, 7.90; N, 4.78. Found C, 65.87; H, 7.91; N, 5.06.

EXAMPLE 31

*Preparation of 2,3,5-triphenyl-1-methyl-4-benzoyl-pyrrole*

2.51 grams of anhydro-5-hydroxy-3-methyl-2,4-diphenyloxazolium hydroxide (10 millimoles), 2.47 grams of 1-benzoyl-2-phenylacetylene (12 millimoles) and 10 cubic centimeters of xylene were heater for 15 minutes to 100–120° C. (bath temperature), the solvent was distilled off in vacuo and the residue was crystallized from methanol. There was obtained 2.81 grams of product, i.e. 68 percent of the theoretical yield. After recrystallization from ethanol the colorless needles melted at 214–215° C. In the infrared spectrum the carbonyl frequency is found at 1625 cm.$^{-1}$. Upon analysis the product had the following composition. Calculated for $C_{30}H_{23}NO$ (molecular weight 413.5): C, 87.14; H, 5.61; N, 3.39. Found C, 87.16; H, 5.72; N, 3.08.

EXAMPLE 32

*Preparation of 2-[2,5-dimethyl-3,4-bis-methoxy carbonyl-pyrole-(1)]-maleic acid dimethyl ester*

890 milligrams of D,L-alanine (10 millimoles) were heated with 15 cubic centimeters of acetic anhydride and 5 cubic centimeters of acetylene-dicarboxylic acid dimethyl ester for 30 minutes in a bath at 140° C., 96 percent of the calculated amount of carbon dioxide being evolved at the half-reaction-time of 3 minutes. The light brown solution was concentrated under 11 torrs, the residue was crystallized from ethanol. There was obtained 1.57 grams of product having a melting point 112–114° C. This represented 45 percent of the theoretical yield. After repeated recrystallization from methanol the colorless pyrrole derivative melted at 119–120° C. Upon analysis the product had the following composition. Calculated for $C_{16}H_{19}NO_8$ (molecular weight 353.3): C, 54.39; H, 5.42; N, 3.97. Found C, 54.53; H, 5.47; N, 4.27.

EXAMPLE 33

*Preparation of 2-[2,5-dibenzyl-3,4-bis-methoxy carbonyl-pyrrole-(1)]-maleic acid dimethyl ester*

1.15 grams of N-phenyl-acetyl-phenylalanine (4.45 millimoles), 5 cubic centimeters of acetylene dicarboxylic acid dimethyl ester and 5 cubic centimeters of acetic anhydride were heated for 70 minutes to 130° C. (bath temperature) and subsequently concentrated at 11 torrs. The distillation of the residue at 240–260° C. (bath temperature) and 0.05 torr produced 1.84 grams of a yellow, viscous resin which upon repeated distillation at 230–240° C. (bath temperature) and 0.04 torr was crystallized from methanol. After double recrystallization from methanol the greenish needles melted at 137–138° C. There was obtained 576 milligrams of product which represented 11 percent of the theoretical yield. Upon analysis the product had the following composition. Calculated for $C_{28}H_{27}NO_8$ (molecular weight 505.5): C, 66.53; H, 5.38; N, 28.77. Found C, 66.81; H, 5.42; N, 2.90.

EXAMPLE 34

*Preparation of the 2-[2-methyl-5-benzyl-3,4-bis-methoxy carbonyl-pyrryl-(1)]-maleic acid dimethyl ester*

In a bath having a temperature of 130° C. was heated a solution of 1.65 grams of D,L-phenylalanine (10 millimoles) in 10 cubic centimeters of acetic anhydride while 5 cubic centimeters of acetylenedicarboxylic acid dimethyl ester were added drop by drop over a period of one hour. After 2 hours the evolution of carbon dioxide was finished with 8.8 millimoles. The residue of the reaction solution which had been concentrated in a water jet vacuum was crystallized from methanol. There was obtained 455 milligrams of product having a melting point of 128–131° C. This represented 10.6 percent of the theoretical yield. The pale yellow crystals recrystallized from methanol, melted at 131–132° C. The infrared spectrum showed the ester-carbonyl groups at 1725 and 1705 cm.$^{-1}$; an NH group is not present. Upon analysis the product had the following composition. Calculated for $C_{22}H_{23}NO_8$ (molecular weight 429.4): C, 61.53; H, 5.40; N, 3.27. Found C, 61.62; H, 5.66; N, 3.63.

EXAMPLE 35

*Preparation of 2-[2-n-amyl-5-(2-methyl-propyl)-3,4-bis-methoxycarbonyl-pyrryl-(1)]-maleic acid dimethyl ester*

2.29 grams of N-capronyl-D,L-leucine (10 millimoles) were heated with 7.10 grams of acetylenedicarboxylic acid dimethyl ester (50 millimoles) and 5 cubic centimeters of acetic anhydride for 40 minutes to 110–115° C. with evolution of 9.5 millimoles of carbon dioxide. Treatment by distillation produced at 210–220° C. (bath temperature) and 0.05 torr. 3.97 grams (98 percent yield) of a viscous, yellow oil which upon renewed distillation passed over at 195–200° C. and 0.05 torr. Upon analysis the product had the following composition. Calculated for $C_{23}H_{33}NO_8$ (molecular weight 451.5): C, 61.18; H, 7.37; N, 3.10. Found C, 61.24; H, 7.43; N, 3.19.

EXAMPLE 36

*Preparation of 2-[2-methyl-5-(4-acetoxy-phenyl)-3,4-bis-methoxycarbonyl-pyrryl-(1)]-maleic acid dimethyl ester*

The mixture of 1.81 grams of L-tyrosine (10 millimoles), 6 cubic centimeters of acetylenedicarboxylic acid dimethyl ester and 10 cubic centimeters of acetic anhydride was heated for 2.5 hours in a bath of 140° C. and the clear, light brown solution was concentrated under 11 torrs. The high-vacuum distillation produced at 250–265° C. (bath temperature) and 0.02 torr 3.69 grams of a viscous yellow oil which crystallized from methanol. There was obtained 1.89 grams of product having a melting point of 104–107° C. This represented 39 percent of the theoretical yield. By recrystallization from methanol the desired pyrrole derivative was obtained in the form of greenish, firm crystals, melting point of 108–109° C. Upon analysis the product had the following composition. Calculated for $C_{24}H_{25}NO_{10}$ (molecular weight 487.5): C, 59.13; H, 5.17; N, 2.87. Found C, 60.61; H, 5.32; N, 2.88.

EXAMPLE 37

*Preparation of 2-[2-methyl-5-(β-indolyl-methyl)-3,4-bis-methoxycarbonyl-pyrryl-(1)]-maleic acid dimethyl ester*

2.04 grams of D,L-tryptophan (10 millimoles), 8 cubic centimeters of acetylenedicarboxylic acid dimethyl ester and 10 cubic centimeters of acetic anhydride were heated for 1 hour to 120° C., concentrated under 11 torrs and the residue was crystallized from methanol. There was obtained 1.71 grams of pyrrole product having a melting point of 152–154° C. Treatment of the mother liquor produced further 724 milligrams of crystals. After repeated recrystallization from methanol yellow needles were obtained. There was obtained 2.43 grams of product having a melting point of 156–157° C. This represented 52 percent of the theoretical yield. Upon analysis the product had the following composition. Calculated for $C_{24}H_{24}N_2O_8$ (molecular weight 468.5): C, 61.53; H, 5.16; N, 5.98. Found C, 61.95; H, 5.25; N, 5.89.

EXAMPLE 38

*Preparation of 2-[2,5-diisopropyl-3,4-bis-methoxy-carbonyl-pyrryl-(1)]-maleic acid dimethyl ester*

1.87 grams of N-isobutyryl-D,L-valine (10 millimoles) were heated with 7.10 grams of acetylene-dicarboxylic acid dimethyl ester (50 millimoles) and 5 cubic centimeters acetic anhydride for 2.5 hours to 130° C. The residue of the dark solution produced upon distillation at 185–200° C. at 0.02 torr 3.72 grams of a viscous, yellow oil which at the second distillation went over at 180–185° C. 0.005 torr. The oily pyrrole was obtained in 91 percent yield. Upon analysis the product had the following composition. Calculated for $C_{20}H_{27}NO_8$ (molecular weight 409.4): C, 58.67; H, 6.65; N, 3.42. Found C, 57.88; H, 6.69; N, 3.26.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A process for the preparation of pyrroles of the formula:

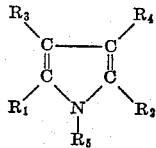

which comprises contacting an acetylenic compound of the formula:

$$R_3C \equiv CR_4$$

and an azlactone selected from the group consisting of

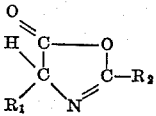

and

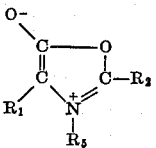

wherein $R_1$–$R_5$, individually, represent a member selected from the group consisting of hydrogen, and monovalent aliphatic, cycloaliphatic, aromatic and heterocyclic groups containing up to 12 carbon atoms; at a temperature of from about 0° to about 140° C., and thereafter recovering said pyrrole.

2. The process of claim 1 wherein said acetylenic compound and said azlactone are contained in an inert solvent.

3. The process of claim 2 wherein said inert solvent is xylene.

4. The process of claim 1 wherein said azlactone is formed in situ from an amino acide having a primary amino group.

5. The process of claim 1 wherein said azlactone is formed in situ from an amino acid having a secondary amino group.

6. The process of claim 1 wherein said azlactone is formed in situ from an N-acyl amino acid.

7. A process for the preparation of pyrroles of the formula:

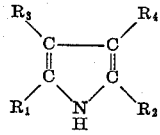

which comprises contacting an acetylenic compound of the formula:

$$R_3C \equiv CR_4$$

and an azlactone of the formula:

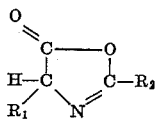

wherein $R_1$–$R_4$, individually represent a member selected from the group consisting of hydrogen, and monovalent aliphatic, cycloaliphatic, aromatic and heterocyclic groups containing up to 12 carbon atoms; at a temperature of from about 0° to about 140° C., and thereafter recovering said pyrrole.

8. A process for the preparation of pyrroles of the formula:

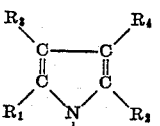

which comprises contacting an acetylenic compound of the formula:

$$R_3C \equiv CR_4$$

and a mesoionic azlactone of the formula:

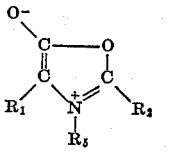

wherein $R_1$–$R_5$, individually represent a member selected from the group consisting of hydrogen, and monovalent aliphatic, cycloaliphatic, aromatic and heterocyclic groups containing up to 12 carbon atoms; at a temperature of from about 0° to about 140° C., and thereafter recovering said pyrrole.

References Cited by the Examiner

Harnes et al.: J. Am. Chem. Soc., vol. 72, pp. 4618–21 (1950).

Huisgen et al.: Angewandte Chemie (Int'l Ed), vol. 1 (1962), page 50.

Lespagnol et al.: Chemical Abstracts, vol. 50; col. 3399a (abstract of Bull. Soc. Pharm. Lille (1955), No. 1, pp. 87–9).

Sprio et al.: Chemical Abstracts, vol. 53, vol. 16106a (abstract of Ann. Chim. Rome, vol. 49; 169–75, 1959).

ALEX MAZEL, *Primary Examiner.*

HENRY R. JILES, JOSEPH A. NARCAVAGE,
*Assistant Examiners.*